United States Patent Office 3,644,555
Patented Feb. 22, 1972

3,644,555
PROCESS FOR THE PRODUCTION OF ACETYLENE, OR ACETYLENE AND ETHYLENE BY PYROLYSIS OF HYDROCARBONS
Zoltan Nagy and Laszlo Szepesy, Budapest, and Attila Kovacs and Zsigmond Sebestyen, Veszprem, Hungary, assignors to Magyar Asvanyolaj es Foldgaz Kiserleti Intezet, Veszprem, Hungary
Filed Aug. 26, 1969, Ser. No. 853,107
Claims priority, application Hungary, Aug. 28, 1968, MA–1,884
Int. Cl. C07c *11/24, 3/00*
U.S. Cl. 260—679
10 Claims

ABSTRACT OF THE DISCLOSURE

This invention relates to a process for producing acetylene or a mixture of acetylene and ethylene from hydrocarbons, by pyrolysis, carried out by means of the heat quantity produced by a nearly stoichiometric burning of a mixture of combustible gases or vapours and an oxidizing gas, preferably oxygen of technical purity or air enriched in oxygen.

---

Figure 1:
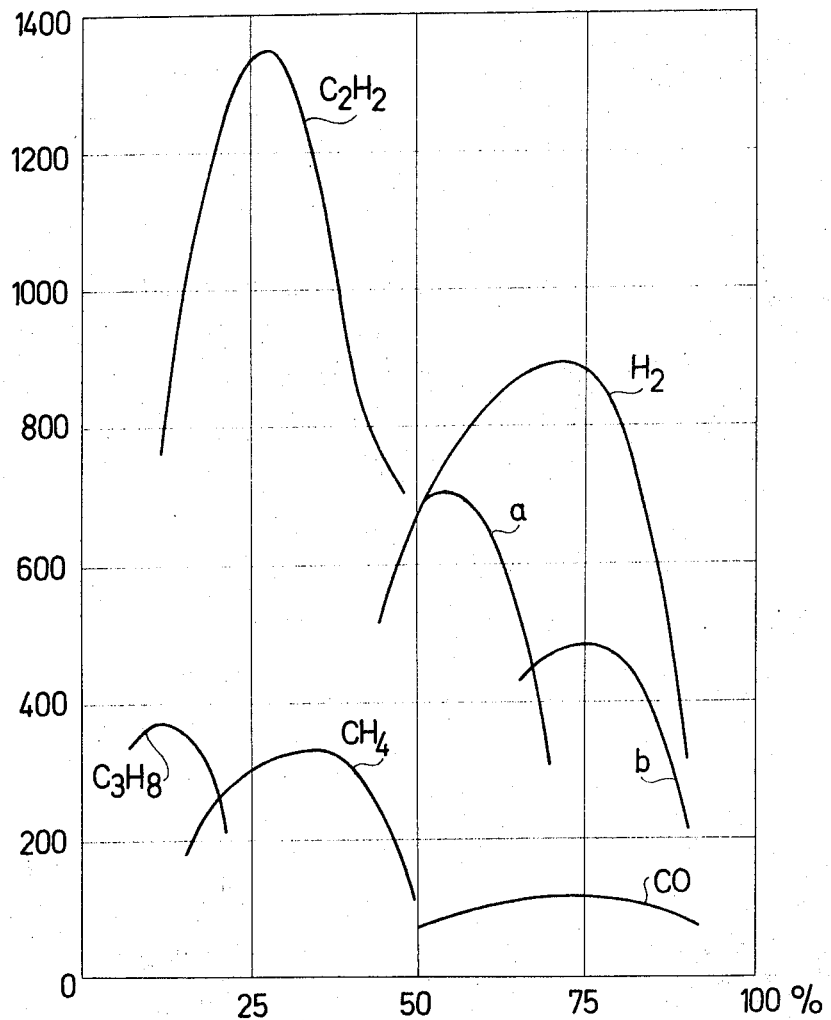

It is known that both acetylene and ethylene are used more and more as raw materials in modern plastic production. Currently acetylene or acetylene and ethylene, or a product containing one or both of them, can be produced by pyrolysis of gaseous or liquid hydrocarbons. The pyrolsis supplies not only acetylene and ethylene and as byproducts hydrogen, methane and higher hydrocarbons, but in the presence of oxygen, or oxygen-containing gases, some water vapour, carbon monoxide and carbon dioxide, too.

The pyrolysis takes place at a temperature from 1000 to 1500° C., with a residence time of $3-6 \times 10^{-3}$ sec. Owing to the endothermic reaction, within a short period a large heat quantity is to be transferred to the raw material to be pyrolysed. This requirement is one of the main difficulties in the pyrolysis.

A frequently used method of the heat transfer consists in mixing the hydrocarbon to be pyrolysed with oxygen or other oxidizing gas in such a proportion, that by burning this gas mixture, the hydrocarbon will be put partially oxidized (PO processes), and the heat gained is transferred directly to the unburned raw material whereby the heat-quantity necessary for the pyrolysis is covered. A well-known example for this method is the partial oxidation of methane for producing acetylene and synthesis gas. According to this method, usually a mixture preheated to 500 to 600° C. of 62% of methane and 38% of oxygen by volume will be partially burned. The quenching of the nearly 1500° C. reaction results in a product containing 8.2% by volume of acetylene, furthermore hydrogen, carbon monoxide, carbon dioxide and methane. The composition of the gas mixture charged is nearly at the upper burning limit. Using less oxygen, the mixture cannot burn, whereas higher oxygen concentrations render less acetylene. It is advisable to preheat the mixture of methane and oxygen to be reacted, thereby improving the formation conditions of the acetylene and reducing the oxygen consumption. The upper limit of the preheating is given by the ignition temperature of methane (645° C.).

According to another important group of pyrolysis methods the heat production and the decomposition are carried out in two steps (two chamber processes). A common feature of these reactions is that a nearly stoichiometric composition of oxygen and any kind of fuel gases, advantageously rich in hydrogen, is burned in the first chamber. The temperature of the resulted combustion gas will be reduced with steam from 2700–2900° C. to 2400–2500° C. Then the hydrocarbons to be pyrolysed will be mixed with this heat-transferred gas, and the product gases will be quenched at a convenient moment. Due to the high reaction rate of pyrolysis reactions, the admixing of hydrocarbons to be pyrolysed with the heat transferring gases must be carried out with a high intensivity. Both the heat transferring gases and the hydrocarbons to be pyrolysed must have very high flow velocity, usually equal to the sound velocity or even higher, and for this purpose complicated constructions must be used. For achieving the safety necessary to the combustion and a conveniently fast burning, the fuel gas and the oxidizing gas have to be mixed also in the range of sound velocity. The difficulties with the high temperature combustion gases, the high energy consumption for mixing, and the inhomogeneities in the mixing which become more pronounced with increase of the dimensions, damage not only the yields, but require complicated and expensive constructions.

Comparing the two methods, the two chamber processes have many advantages in relation to the partial oxidation. The heat quantity necessary for decomposition can be produced with the combustion of a nearly stoichiometric mixture of the combustible gases with higher fuel qualities, and that means a lower oxygen consumption. Further more, the two chambers processes have no difficulties with the combustion burning limits, and they have broad limits in respect of both raw material and reaction temperature. On the other hand, by the partial oxidation processes the same heat quantity can be produced only with a higher oxygen consumption because of the higher suecific oxygen consumption needed (kg. oxygen/kcal.) for the burning of the hydrocarbons. Moreover, the reaction conditions for carrying out a partial oxidation of methane are given by the upper burning limit of the mixture; so the PO process has a one value less degree of freedom than the two chamber processes. Owing to this fact the PO process is more limited concerning both the raw materials and products, and the yields are about half of the yields obtained by the two chamber processes. An essential advantage of the PO process is, however, that the maximum temperature inside the equipment is only 1500° C. as against the temperatures of 2400–2500° C. set with steam in the two chamber processes. For this reason there are no difficulties with the mixing of high temperature combustion gases and the raw material; moreover, the heat stress of the construction material is remarkably lower.

With the process according to the Hungarian Pat. No. 152,848, much better specific consumption data can be gained in a PO-like flame reaction than with the original PO-process, if the hydrocarbons raw material (gases and vapours) are premixed before the reaction with fuel gases having better combustion properties than the hydrocarbons to be decomposed. During this reaction the temperature is only 1100–1500° C. inside the reaction chamber and so the heat stress of the construction material falls down and even the mixing is more simple. But this process has its own burning restriction (upper burning limit) like the PO-process has.

The invention is a process for producing acetylene, or a mixture of acetylene and ethylene from hydrocarbons, by pyrolysis carried out by means of the heat quantity produced by a nearby stoichiometric burning of a mixture of combustible gases or vapours and an oxidizing gas, preferably oxygen of technical purity or air enriched in oxygen, wherein the hydrocarbons to be pyrolysed, the combustible gases or vapours, and the oxidizing gas are separately introduced into the burner of the reactor, dividing every aforesaid component into several co-current material streams, then admixing the oxidizing gas or at least 10% by volume of same to the combustible gases or vapours before introducing into the reaction chamber, adding the rest of the oxidizing gas to the premixed combustible mixture at the inlet of the reaction chamber, igniting the thus-obtained well-combustible mixture at the inlet, simultaneously introducing the hydrocarbon streams to be pyrolysed into the reaction chamber co-currently with the flames of the fuel, transferring directly the heat deliberated by combustion to the hydrocarbon streams to be decomposed, and quenching the reaction products after a residence time necessary for the pyrolysis.

The quality of the unsaturated hydrocarbons to be produced, first of all the production of acetylene and ethylene, and their ratio can be preferably controlled by the temperature of the pyrolysis, and this temperature is set to a value of from 1000 to 1500° C. by the proportion of the hydrocarbons to be pyrolysed to the fuel gases or vapours, in accordance with their composition.

It is known that the burning velocity of various combustible mixtures is very different, and it has its maximal value near the stoichiometric composition. The change of the burning velocity in cm./sec. is plotted against the mixture composition in percent by volume for some combustible gases and oxygen on FIG. 1 ($a$=producer, gas: $b$=water gas), according to Fritz Schuster: "Energetic Fundamentals of Gas Technology" (Energetische Grundlagen der Gastechnik) 2. edition; 1950, p. 88. Furthermore it is known, that to assure a continuous burning, the flow velocity of the mixture must be chosen between the premixing and burning place so that a flashback to the premixing point and a detaching of the flame in the burning place can be avoided. For satisfying the demands of the modern big industry by the reactor capacity, at least 10% of the oxidizing gas has to be premixed with the combustible gases or vapours before entering the reaction chamber, according to the burning properties of the fuel streams.

An advantage of the process according to the invention is that it permits broad limits for the composition of material streams; this means favourable applications for the process. On the other hand, no burning limit hinders the carrying out of the process while a wholly or partly premixed, nearby stoichiometric composition will be burned. As the burning reaction and the pyrolysis are carried out in a common reaction chamber, the difficulties of mixing and of the high temperature are less problematical than in the case of the well-known two chamber processes.

An essential advantage of the process according to the invention is, in relation to the two chamber processes, that it can be carried out without feeding in any stream. At the two chamber processes steam is fed into the burning chamber to decrease the temperature of the primary combustion products. Of course, this steam gets into the reaction chamber and influences even the reaction equilibrium of the process. According to the present invention no steam is required for protection of the burning chamber. Steam will be introduced only in such a quantity which is necessary to achieve the most favourable reaction conditions. The steam used to the decomposition can be premixed to which ever reaction component or fed in directly to the reaction chamber.

It was found, that for our process, which can be carried out on atmospheric or higher, up to 10 atm. pressures, it is favourable if the hydrocarbons to be pyrolysed, the fuel gases or vapours, the oxidizing gas and steam or one more of them is heated to a temperature of 200–700° C. before entering the reaction chamber, because the oxygen consumption can be decreased and the yields raised in this way.

Beside the acetylene, or acetylene and ethylene, the pyrolysis product contains a large quantity of carbon monoxide, carbon dioxide, steam, hydrogen and methane, too. After separating the main products, the quantity of carbon monoxide, hydrogen and methane usually exceeds the quantity of the fuel gas needed for heat production. So the byproduct gases of the pyrolysis cover the fuel gas demand of the process according to the invention. Of course any other combustible gas or gas mixture can be used, even of a composition identical with that of the hydrocarbons to be pyrolysed.

It was found that for quenching the reaction products both water preheated to 70–80° C. and oil destillate can be used. In the last case a large part of the heat obtained by quenching can be used for steam production.

The process according to the invention is further illustrated by the aid of the following examples.

EXAMPLE 1

The pyrolysis of a straight run naphtha fraction of 40–140° C. is carried out at atmospheric pressure in a small scale reactor. For producing the heat quantity necessary to pyrolysis an oxidizing gas containing 98% oxygen by volume and a fuel gas with the following composition were used:

|   | Percent by vol. |
|---|---|
| $H_2$ | 70.0 |
| $CO_2$ | 9.0 |
| $N_2$ | 21.0 |

Each of the components was introduced divided in four co-current material streams into the reaction chamber.

About 20% by volume of the oxidizing gas were mixed to the fuel gas, before its entering the reaction chamber. The rest of the oxidizing gas, about its 80% by volume, was given to the premixed combustible mixture at its feeding point into the reaction chamber. The well-combustible mixture thus-obtained with a nearby stoichiometric composition was ignited on its forming place; and the naphtha to be pyrolysed was introduced co-currently with the flames into the reaction chamber. The quantity of the reaction components per hour and their temperature before the reactor were:

|   | ° C. |
|---|---|
| Straight run naphtha fraction, 74 kg./h. | 400 |
| Fuel gas, 100 Nm.³/h. | 20 |
| Oxidizing gas, 35 Nm.³/h. | 20 |

The pyrolysis products were quenched with water after a residence time of $3.5 \times 10^{-3}$ sec. and yielded the dry product gases of the following composition:

|   | Percent by vol. |
|---|---|
| $C_2H_2$ | 10.9 |
| $C_2H_4$ | 10.4 |
| $C_3H_6$ | 0.3 |
| $CH_4$ | 10.1 |
| $C_2H_6$ | 0.2 |
| $CO$ | 13.9 |
| $CO_2$ | 6.7 |
| $H_2$ | 32.9 |
| $O_2$ | 0.3 |
| $N_2$ | 14.3 |

EXAMPLE 2

In a similar small scale reactor as used in Example 1, the pyrolysis of a straight run naphtha fraction of 40–140° C. was carried out under a pressure of 4 atm. To produce the heat quantity necessary for pyrolysis, an oxidizing gas with an oxygen content of 98% oxygen by volume and methane were used. The naphtha to be pyrolysed was first vapourised, then mixed with steam, overheated to 200° C. This mixture was heated to 500° C. and introduced into the reactor.

As in Example 1, each reaction component was introduced divided in four co-current material streams into the reaction chamber. The whole quantity of oxidizing gas was admixed to the methane before its entering into the reaction chamber. Further on, the reaction was carried out as in Example 1.

The quantity of the reaction components per hour and their temperature before the reactor were:

|  | ° C. |
|---|---|
| Straight run naphtha fraction, 1200 kg./h. | 500 |
| Steam | 500 |
| Methane, 350 Nm.³/h. | 480 |
| Oxidizing gas, 750 Nm.³/h. | 520 |

The pyrolysis products were quenched with recirculated oil after a residence time of $4.5 \times 10^{-3}$ sec. and yielded the dry product gases of the following composition:

|  | Percent by vol. |
|---|---|
| $C_2H_2$ | 9.2 |
| $C_2H_4$ | 12.4 |
| $C_3H_6$ | 0.4 |
| $CH_4$ | 10.6 |
| $C_2H_6$ | 0.2 |
| $CO$ | 21.1 |
| $CO_2$ | 9.8 |
| $H_2$ | 35.3 |
| $O_2$ | 0.4 |
| $N_2$ | 0.6 |

EXAMPLE 3

The pyrolysis of methane was carried out at a pressure of 1.1 atm. in a small scale reactor. The heat quantity necessary for pyrolysis was produced with oxygen of technical purity, containing 98% of oxygen by volume. Each reaction component was introduced divided in four co-current material srteams into the reaction chamber and the whole quantity of oxygen was admixed to the fuel gas before entering into the reaction chamber. The well-combustible mixture thus-obtained, with a nearby stoichiometric composition, was ignited at its entering point into the reaction chamber; and the methane to be pyrolysed was introduced also co-currently with the flames into the reaction chamber.

The quantity of the reaction components per hour and their temperature before the reactor were:

|  | ° C. |
|---|---|
| Hydrocarbon to be pyrolysed (methane) 210 Nm.³/h | 630 |
| Fuel gas (methane) 80 | 630 |
| Oxidizing gas (98% $O_2$+2% $N_2$ by vol.) 164 | 650 |

The pyrolysis products were quenched with water having a temperature of 75° C. after a residence time of $4 \times 10^{-3}$ sec. and yielded the dry product gases of the following composition:

|  | Percent by vol. |
|---|---|
| $C_2H_2$ | 8.9 |
| $C_2H_4$ | 0.6 |
| $CO$ | 24.3 |
| $CO_2$ | 3.7 |
| $H_2$ | 55.5 |
| $O_2$ | 0.3 |
| $N_2$ | 0.6 |

What we claim is:

1. A process for producing acetylene and ethylene from hydrocarbons, by pyrolysis, carried out by means of the heat quantity produced by about stoichiometric burning of a mixture of combustible gases and an oxidizing gas, wherein the hydrocarbons to be pyrolysed, the combustible gases and the oxidizing gas are separately introduced into the burner of the reactor, dividing every aforesaid component into several co-current material streams, then admixing at least 10% by volume of the oxidizing gas with the combustible gases before introducing into the reaction chamber, adding the rest of the oxidizing gas to the premixed combustible mixture at the inlet of the reaction chamber, igniting the thus-obtained combustible mixture at the inlet, simultaneously introducing the hydrocarbon streams to be pyrolysed into the reaction chamber co-currently with the flames of the fuel, transferring directly the heat liberated by combustion to the hydrocarbon streams to be decomposed, and quenching the reaction products after pyrolysis.

2. A process as claimed in claim 1, wherein the quality of the unsaturated hydrocarbons to be produced and their ratio are controlled by the temperature of the pyrolysis, and this temperature is set to a value of from 1000 to 1500° C. by the proportion of the hydrocarbons to be pyrolysed to the fuel gases in accordance with their composition.

3. A process as claimed in claim 1, wherein to one of the reaction components before entering into the reaction chamber water vapour is added in an amount of max. 50% by weight of the hydrocarbons to be pyrolysed.

4. A process as claimed in claim 1 wherein the hydrocarbons to be pyrolysed are preheated to a temperature of 200 to 700° C. before entering the reactor.

5. A process as claimed in claim 1, wherein the reaction is carried out in a pressure range of 0.5 to 10 atm.

6. A process as claimed in claim 1, wherein the remaining gases obtained after separating the unsaturated hydrocarbons from the product gases, i.e. a gas mixture consisting mainly of hydrogen, carbon monoxide and methane, are used as fuel gases.

7. A process as claimed in claim 1, wherein the fuel gas has the same composition as the hydrocarbons to be pyrolysed.

8. A process as claimed in claim 1, wherein a petroleum fraction is used for quenching the reaction products.

9. A process as claimed in claim 1, wherein water vapor is introduced directly into the reaction chamber in an amount of max. 50% by weight of hydrocarbon to be pyrolyzed.

10. A process as claimed in claim 1, wherein said reaction products are quenched after a residence time of about $3-6 \times 10^{-3}$ sec.

References Cited

UNITED STATES PATENTS

| 2,985,698 | 5/1961 | Pechtold et al. | 260—683 |
| 2,179,379 | 11/1939 | Metzger | 260—679 |
| 2,236,535 | 4/1941 | Hasche | 260—679 |
| 2,790,838 | 4/1957 | Schrader | 260—679 |
| 2,822,411 | 2/1958 | Braconier et al. | 260—679 |
| 2,934,410 | 4/1960 | Smith | 23—277 |

DELBERT E. GANTZ, Primary Examiner

J. M. NELSON, Assistant Examiner

U.S. Cl. X.R.

208—130; 260—683 R